(12) United States Patent
Herman et al.

(10) Patent No.: US 11,700,458 B2
(45) Date of Patent: Jul. 11, 2023

(54) WHITE BALANCE AND COLOR CORRECTION FOR INTERIOR VEHICLE CAMERA

(71) Applicant: Ford Global Technologies, LLC, Dearborn, MI (US)

(72) Inventors: David Michael Herman, West Bloomfield, MI (US); Larry Sanders, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 17/396,007

(22) Filed: Aug. 6, 2021

(65) Prior Publication Data

US 2023/0043536 A1 Feb. 9, 2023

(51) Int. Cl.
*H04N 23/88* (2023.01)
*G06T 3/40* (2006.01)
*G06T 15/50* (2011.01)
*G06T 5/00* (2006.01)

(52) U.S. Cl.
CPC ........... *H04N 23/88* (2023.01); *G06T 3/4015* (2013.01); *G06T 5/002* (2013.01); *G06T 15/506* (2013.01); *G06T 2207/20081* (2013.01); *G06T 2207/20084* (2013.01); *G06T 2207/30268* (2013.01)

(58) Field of Classification Search
CPC ....... H04N 23/88; G06T 3/4015; G06T 5/002; G06T 15/506; G06T 2207/20081; G06T 2207/20084; G06T 2207/30268
See application file for complete search history.

(56) References Cited

U.S. PATENT DOCUMENTS

| 9,843,777 | B2 | 12/2017 | Shofield et al. |
| 10,230,873 | B2 | 3/2019 | Wierich |
| 10,257,432 | B2 | 4/2019 | Kussel |
| 2019/0156461 | A1* | 5/2019 | Tajima ................... G06T 5/008 |
| 2020/0228681 | A1 | 7/2020 | Chen et al. |
| 2021/0372920 | A1* | 12/2021 | Ehbets .................. G01J 3/0202 |
| 2022/0063569 | A1* | 3/2022 | Herman .................. B60N 2/90 |

OTHER PUBLICATIONS

Noy Cohen, "A Color Balancing Algorithm for Cameras", Electrical Engineering Department, Stanford University, 2011, 11 pages.
Georgi Zapryanov, "Automatic White Balance Algorithms—A New Methodology for Objective Evaluation", ResearchGate, Technical University of Sofia, Sep. 2015, 7 pages.

* cited by examiner

*Primary Examiner* — Gevell V Selby
(74) *Attorney, Agent, or Firm* — Frank Lollo; Eversheds Sutherland (US) LLP

(57) ABSTRACT

An image is received from a camera built into a cabin of a vehicle. The image is demosaiced and its noise is reduced. A segmentation algorithm is applied to the image. A global illumination for the image is solved. Based on the segmentation of the image and the global illumination, a bidirectional reflectance distribution function (BRDF) for color and/or reflectance information of material in the cabin area of the vehicle is solved for. A white balance matrix and a color correction matrix for the image are computed based on the BRDF. The white balance matrix and the color correction matrix are applied to the image, which is then displayed or stored for addition image processing.

20 Claims, 9 Drawing Sheets

110

110A
$$R^{x,E} = \underline{a}^x \cdot \underline{n}^x I^x S^x(\lambda_i) E^x(\lambda_i)$$
(Ambient Lighting Environment (unknown lighting and color properties of scene))

+

110B
$$\underline{a}^x \cdot \underline{n}^x I^x S^x(\lambda_i) E^x(\lambda_i)$$
(interior lighting, may be applied N times)

↓ light activation (e.g. shift in 10% of color) may provide sufficient knowledge of the lighting environment and, notably, the unknown lighting.

↓

Unknowns: $E_{ambient} = [r,g,b]$
$S_{occupants} = [r,g,b]$  — 114

Knowns: $S_{interior} = [r,g,b]$ — 116

↓

$E^x = E_{ambient} + E_{vehicle}$ a,n can be estimated
I can be measured through camera, etc.
I => point light source description
May use BRDF

FIG. 3

120
Known Cabin Lighting
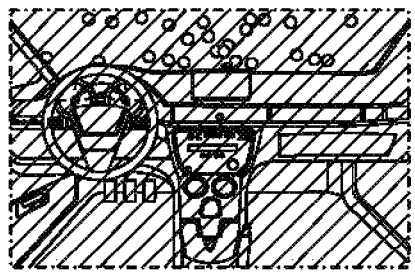 == 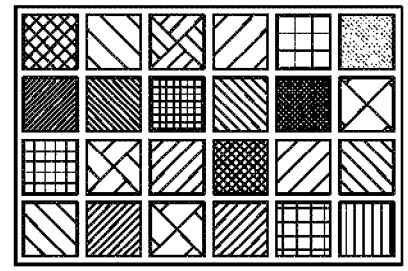
Material / Lighting takes the Place of Color Chart
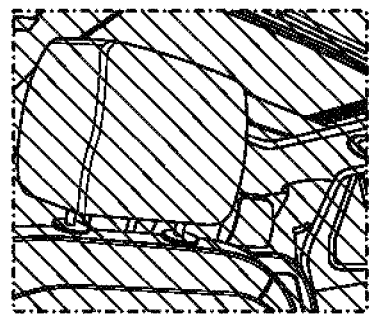 == 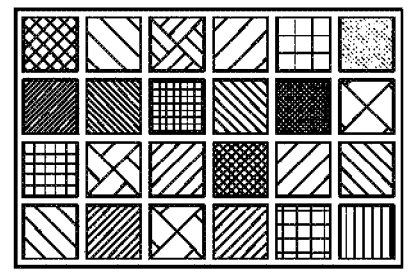
FIG. 4

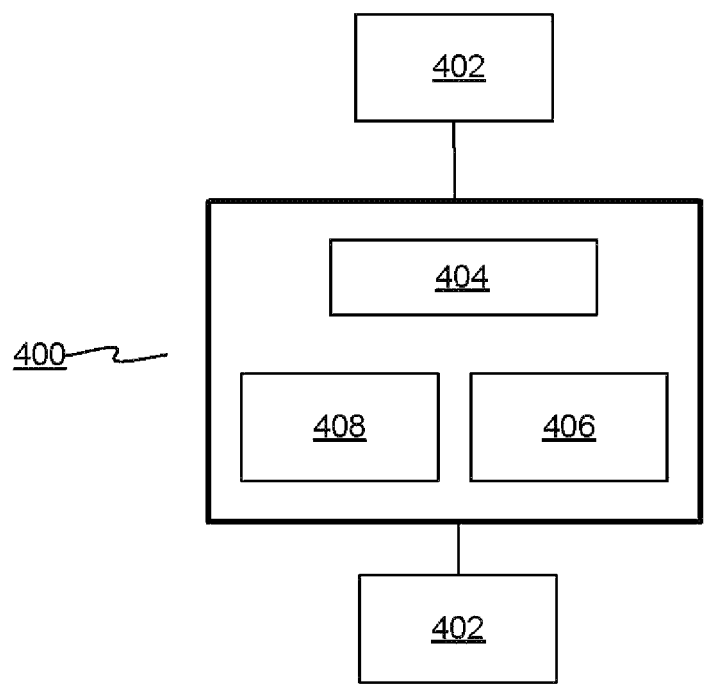
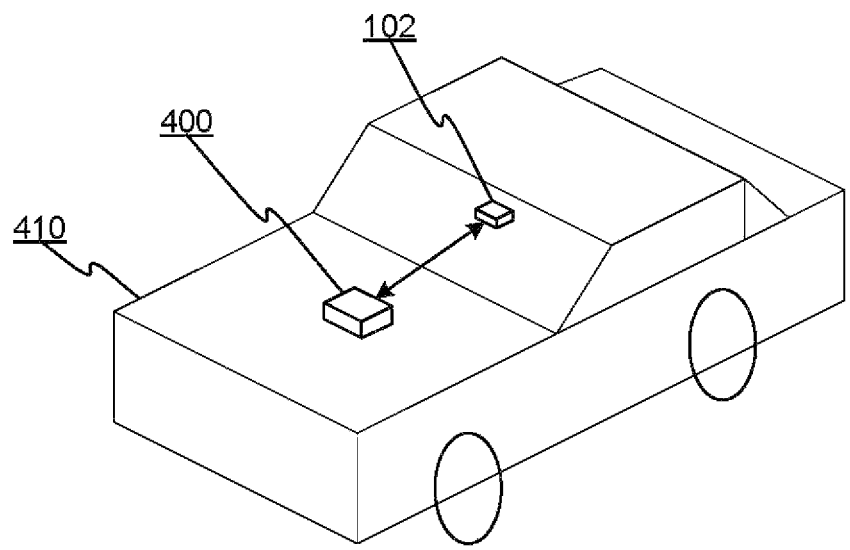
FIG. 9

WHITE BALANCE AND COLOR CORRECTION FOR INTERIOR VEHICLE CAMERA

BACKGROUND

In-cabin cameras of vehicles can provide valuable user-facing features, e.g., video conferencing, face recognition, etc. Often, the cabin of a vehicle contains multiple ambient illumination sources and materials, making white balancing and color correction difficult. Poor color correction and white balancing can produce unaesthetic video, which undermines a user's experience when video conferencing, for example. Color correction and white balancing that produces noisy or inaccurate video can reduce the accuracy and reliability of computer vision applications that perform image processing; automated tasks such as face-recognition may fail. Moreover, in-vehicle cameras that combine red, green, and blue (RGB) and IR sensors create additional challenges in color correction. Furthermore, differing camera processing abilities also add variations that make white balancing and color correction difficult to apply from one camera to the next.

BRIEF DESCRIPTION OF THE DRAWINGS

The present description will be better understood from the following detailed description read in light of the accompanying drawings, wherein like reference numerals are used to designate like parts in the accompanying description.

FIG. 3 shows how the light model formula shown in FIG. 2 can be divided into unknown and known components in accordance with one or more embodiments of the disclosure.

FIG. 4 shows examples of known cabin features in accordance with one or more embodiments of the disclosure.

FIG. 9 shows a computing device in accordance with one or more embodiments of the disclosure.

DETAILED DESCRIPTION

Overview

Figure 1:
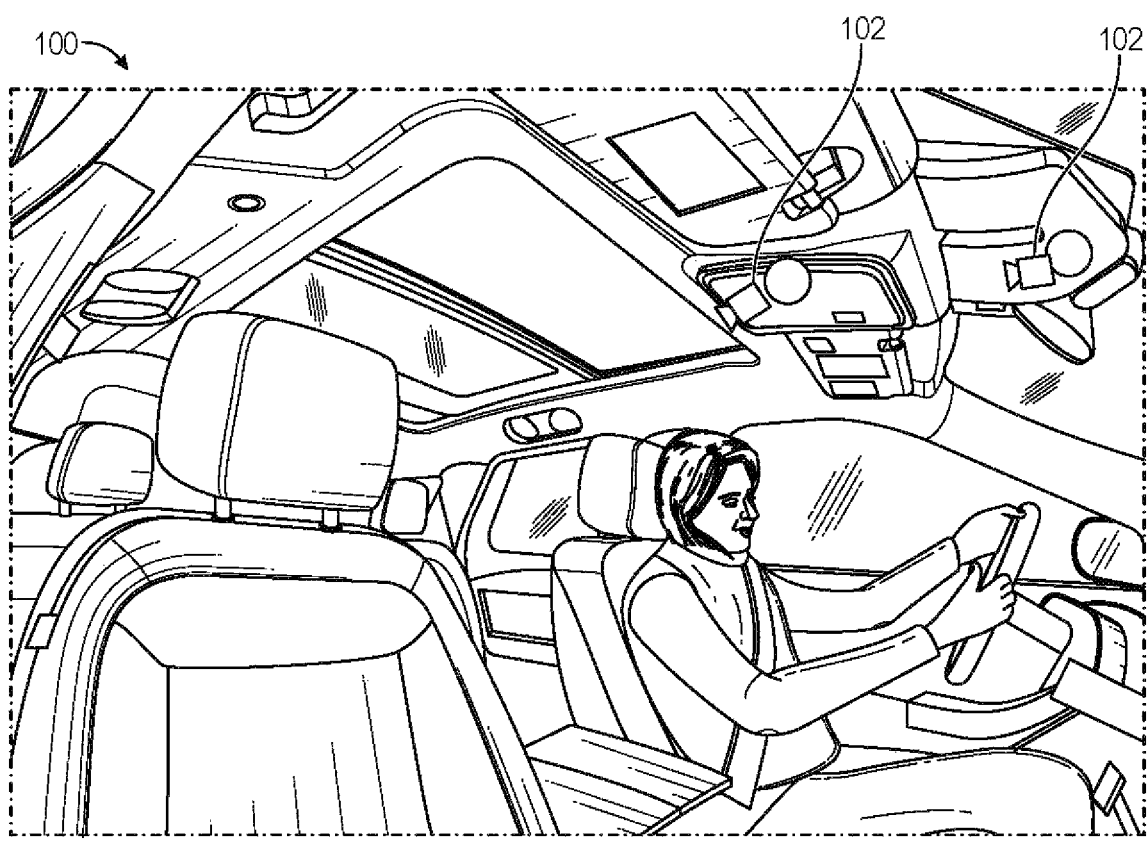
FIG. 1 shows a camera image of a cabin of a vehicle in accordance with one or more embodiments of the disclosure.

Traditional white balancing and color correction of images is based on assumptions about the lighting environment, for instance, natural lighting and natural colors may be assumed (e.g., the "gray world" assumption in which an image, on average, is neutral gray). However, depending on the camera sensor and the display and illumination of the environment, an object may have different apparent color and lighting. For images of an object, this variation can be displeasing to the eye and can reduce the accuracy of image processing algorithms such as computer vision algorithms. In short, there is a problem with uncertainty in the lighting environment within which an image is captured.

Given a camera, and assuming that its color space response function has been measured, there are inherent unknowns such as an object's color space and its bidirectional reflectance distribution function (BRDF). Specifically, in the environment, there may be unknowns, such as ambient light color space and the color space of objects not permanent to a vehicle cabin, and knowns, such as the color space of objects permanent to the vehicle cabin. Regarding object color space, if the color space of an object is assumed, and the camera has been characterized, and if certain color space/distribution assumptions of the environment of the scene (or the illumination) are made (e.g., gray on average), then when these assumptions upon which color space correction and white balancing are performed do not hold, the image resulting from color correction and white balancing can deviate significantly from the ground truth. The ground truth may refer to the true color (e.g., in reality), or human perception of the true color. A machine learning model may be trained using the ground truth to identify color and other image data. A benefit of the present disclosure is a device's improved color estimate precision, thereby allowing a RGB camera to function as a multi-spectral imager while also improving color representation globally and on a per-pixel level.

Embodiments described herein address the color correction and white balance problem by using a system of equations (see FIGS. 1 and 2), by interacting with (e.g., lighting) the environment, and/or by incorporating known features of the environment (e.g., known vehicle interior colors). That is, actuation of cabin lighting or incorporating other exterior knowledge can be used so that, given a response function for the camera, the unknowns mentioned above can be solved and used to derive accurate white balancing matrices and color correction matrices. Regarding a vehicle cabin, knowns might include fabric on seats having certain colors, the existence of shiny bits of chrome fitting or trim that are highly reflective, lighting controlled in the environment (e.g., cabin lights). A highly reflective, but diffuse, light probe may be used. Ideally, the light probe may not be significantly absorbing any color band. For example, a light measuring device may obtain a lower resolution map of the lighting of the environment. The known values can allow the illumination environment to be incorporated, augmented, and/or sampled to improve the modeled illumination of the environment or the color of the object. Another benefit of the present disclosure is that a device may capture ambient lighting inside a vehicle from the vehicle (e.g., sunlight outside of the vehicle captured from inside the vehicle), or from light emitted by a device within the vehicle (e.g., from a cell phone).

In view of the above, an image is received from a camera built into a cabin of a vehicle. Typically, cameras incorporate a color filter array (CFA) where a repeating 2D pattern of filters is place above the sensor array such that each pixel can detect a single-color's light intensity. It is often desirable to convert the resulting image, raw CFA image, to a representation that is more pleasing to human interpretation through a process of spatial and color interpolation. Other filter arrays may be used, such as a micro-lens and/or polarizing lenses. The image may be demosaiced and its noise is reduced. However, for computer vision/neural network applications, it may not be necessary to demosaic an image (e.g., a detection algorithm may use a raw CFA to detect an object of interest). Alternatively, an end-to-end neural network may be used with a raw image plus the known values as inputs, and may generate an output, such as a corrected color image, depth data, and/or detected objects. A segmentation algorithm is applied to the image. A global illumination for the image is solved. Based on the segmentation of the image and the global illumination, a bidirectional reflectance distribution function (BRDF) for color and/or reflectance information of material in the cabin area of the vehicle is solved for. A white balance matrix and a color correction matrix for the image are computed based on the BRDF. The white balance matrix and the color correction matrix are applied to the image, which is then displayed or stored for addition image processing, or may be an output of the multi-spectral image. In this manner, the present disclosure provides for improved image processing for in-vehicle applications.

Embodiments

FIG. 1 shows a camera image 100 of a cabin of a vehicle. One or more cameras 102 are embedded in the structure of the cabin. One or more cameras may feature the presence of a filter array, color, polarization, micro-lens, etc. or some combination thereof. Further one or more cameras may lack a filter array, on a number of pixels or across the entire imager. Camera sensitivity may be improved, especially in low-light conditions, by removing the filter array. By applying the techniques of the present disclosure, devices may identify one or more colors from the image data. One implementation may include using a very sparse array with limited color spatial knowledge, but using the techniques herein to identify the missing pixel color properties to improve color-spatial space estimate's. If the average cabin color in the field of view of the camera was constant (e.g. on average grey) or were subjected to a constant lighting environment, white balancing and color correction could be performed adequately using known algorithms. However, a vehicle cabin is exposed to highly dynamic lighting conditions as well as variation in the color of objects in the field of view of the camera. Weather, time of day, streetlights, headlights of other vehicles, low-horizon sunlight, user computing devices, and other conditions introduce potentially significant unknown lighting and color affects that may affect images of the vehicle cabin. Additionally, the color of objects in the field of view of the camera may vary dramatically and dynamically. These conditions may change rapidly, for instance when exiting and entering tunnels, parking garages, underpasses, watching a movie of a user's smart device (e.g., when permissible based on the usage of the vehicle, such as a driver assist feature, and in compliance with relevant laws), and the like. Large roof windows can exacerbate the effect of external lighting.

As discussed below, the light received by a camera will depend on a combination factors, including external lighting, optical characteristics of internal surfaces (e.g., seatbelt, headrest, cabin wall, colored balloons), camera and surface geometries, and possibly internal lighting (e.g., a roof light). In-cabin lights may use a more narrow wavelength band than a camera sensor does, resulting in further precision in a color space calculation, an allowing for possible computation of a multi-spectral image. However, because some image-affecting factors are known, it is possible to solve for some of the unknowns image-affecting factors such as external lighting (which could be helpful for driver state monitoring systems) or optical characteristics of objects that enter the cabin. Other use cases in which color improvement may improve vehicle or other device features include pulse monitoring based on a user's face color over time by using a camera, and inserting virtual objects into a scene (e.g., for a multi-vehicle group video chat or other computer vision applications, when global illumination and depth have been solved for). When most of the image-affecting variables are known and/or solved, ground-truth color of an image can be estimated. This can allow generation of accurate color correction matrices and white balance matrices. That is, by using known variables, unknown variables can be solved for in illumination equations (discussed below). In this manner, one difference with existing techniques may be the ability to determine a pixel or zone-wise correction matrix, which may further improve color/illuminant variation across an image spatially. Some known variables are the internal surfaces in the cabin of a vehicle. These surfaces may be consistently present and will have consistent bidirectional reflectance distribution functions (BRDFs). Furthermore, many vehicle cabins have highly reflective chrome surfaces. These can be used as de facto light probes, and image data from these chrome surfaces can be used to further enhance the accuracy of color correction matrices and white balance matrices.

Figure 2:
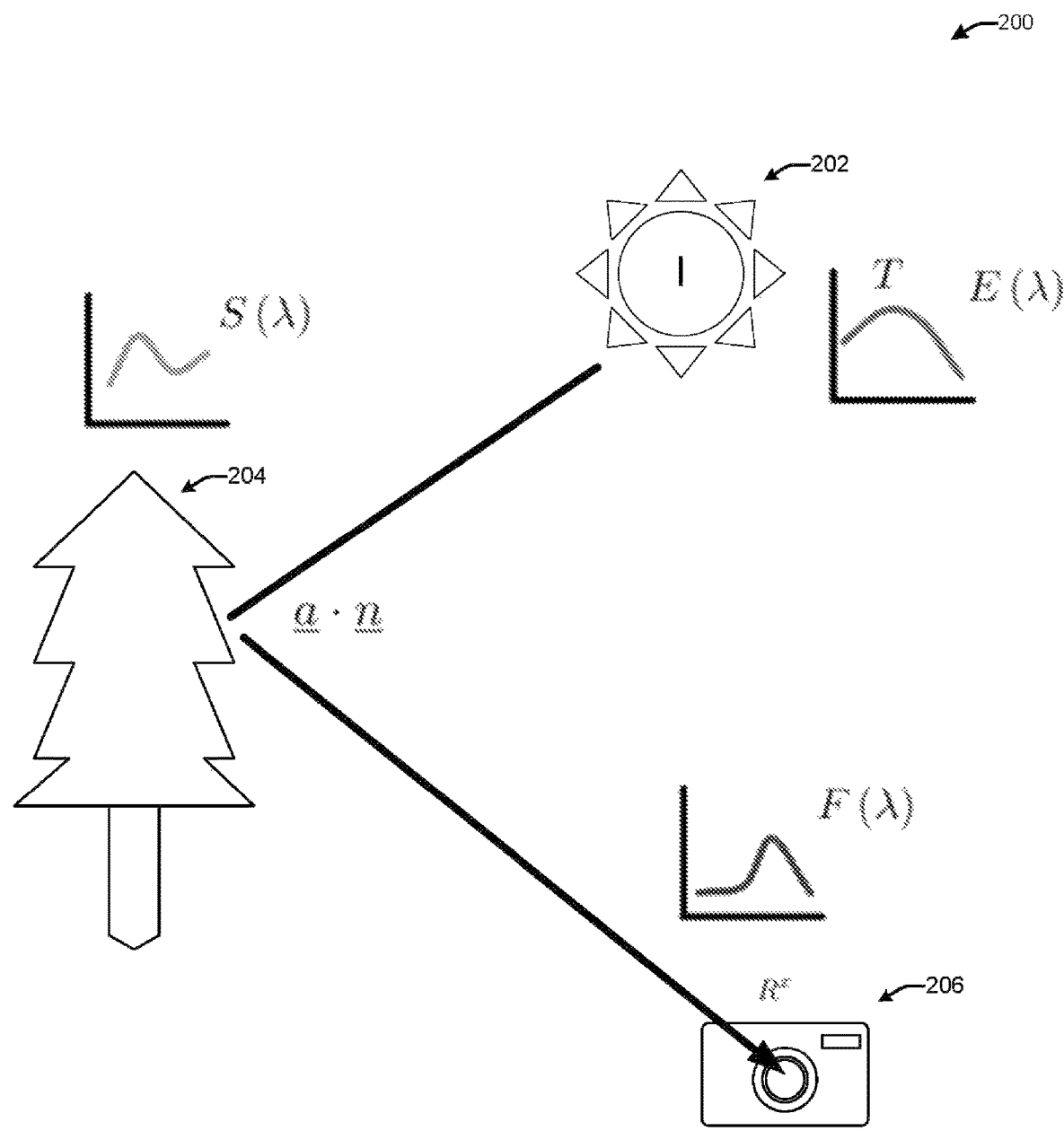
FIG. 2 shows a formula for describing the light received by a camera in accordance with one or more embodiments of the disclosure.

FIG. 2 shows a formula for describing the light received by a camera. FIG. 2 illustrates how aspects of a scene bear on image sensor response. Although daylight is assumed, any type of light source can be represented by the model. The source lighting has an intensity and a spectral power distribution (powers at respective wavelengths). Objects in the scene reflect light per their surface reflectivities (as a function of wavelength) at different incident and reflected angles based on the relative orientation of light source(s), object's surface orientation, and camera(s). The formula 110 in FIG. 2 models camera sensor response as a function of pixel location (x), light-object angle (a), object-camera angle (n), illumination intensity (I), surface reflectivity (S), wavelength, and spectral power distribution (E).

Referring to FIG. 2, a light source 202 (e.g., the sun) may emit light as an ambient light source. The light may reflect off of objects (e.g., a tree 204), and may be captured by a camera 206. I may represent the sum of vehicle light intensity and any ambient light intensity. (a, n) may represent unit vectors as a geometry term. $E(\lambda)$ may represent the spectral power density of external lighting. $S(\lambda)$ may represent an unknown reflectivity of a location x in an image frame. $R^x$ may represent the camera response (e.g., of the camera 206) of the scene (e.g., the image data captured by the camera 206). The camera response may be represented by the formula 110.

FIG. 3 shows how the light model formula shown in FIG. 2 can be divided into an unknown component 110A and a known component 110B. The unknown component 110A represents the unknown lighting and color properties of the scene. The known component 110B represents known interior components, e.g., known surface reflection in the cabin, cabin lighting, etc. Note that the cabin light can be lit, and even a 10% shift in color may suffice to infer the lighting environment (including the unknown lighting) from the induced change in lighting. That is, given unknowns 114 such as ambient E and occupants S (in RGB space), and knowns 116 such as interior reflectivity values, the unknown spectral power distribution can be obtained. In another example, a machine learning algorithm, e.g. neural network, may be designed and trained (e.g. inputs/outputs incorporating terms in the present disclosure) to perform end to end image signal processing (and optionally perception). One may incorporate the present invention such that the algorithm learns the physical relationship.

FIG. 4 shows examples of known cabin features 120. The known cabin features 120 can serve the same function as a pre-defined color chart and can similarly be used to infer color correction matrices and white balance matrices. Color images may be stored in color arrays (e.g., with columns for width, height, and color). An input color image detected by a camera may be converted to such a color array, and the uncorrected and linearized input pixel data O may be represented by an array in which the rows represent normalized and linearized RGB levels of a pixel (e.g., each row providing an R pixel value, a G pixel value, and a B pixel value that are normalized and linearized for the respective pixel to which the row corresponds). The transformed (e.g., corrected) array may be generated using matrix multiplication with the color correction matrix. For example:

$$O = \begin{matrix} O_{R1} & O_{G1} & O_{B1} \\ O_{R2} & O_{G2} & O_{B2} \\ O_{Rk} & O_{Gk} & O_{Bk} \end{matrix}; \text{ and } P = OA = \begin{matrix} A_{11} & A_{12} & A_{13} \\ A_{21} & A_{22} & A_{23} \\ A_{31} & A_{32} & A_{33} \end{matrix},$$

in which the RGB values of each corrected pixel are a linear combination of the three input color channels of the pixel.

Figure 5:
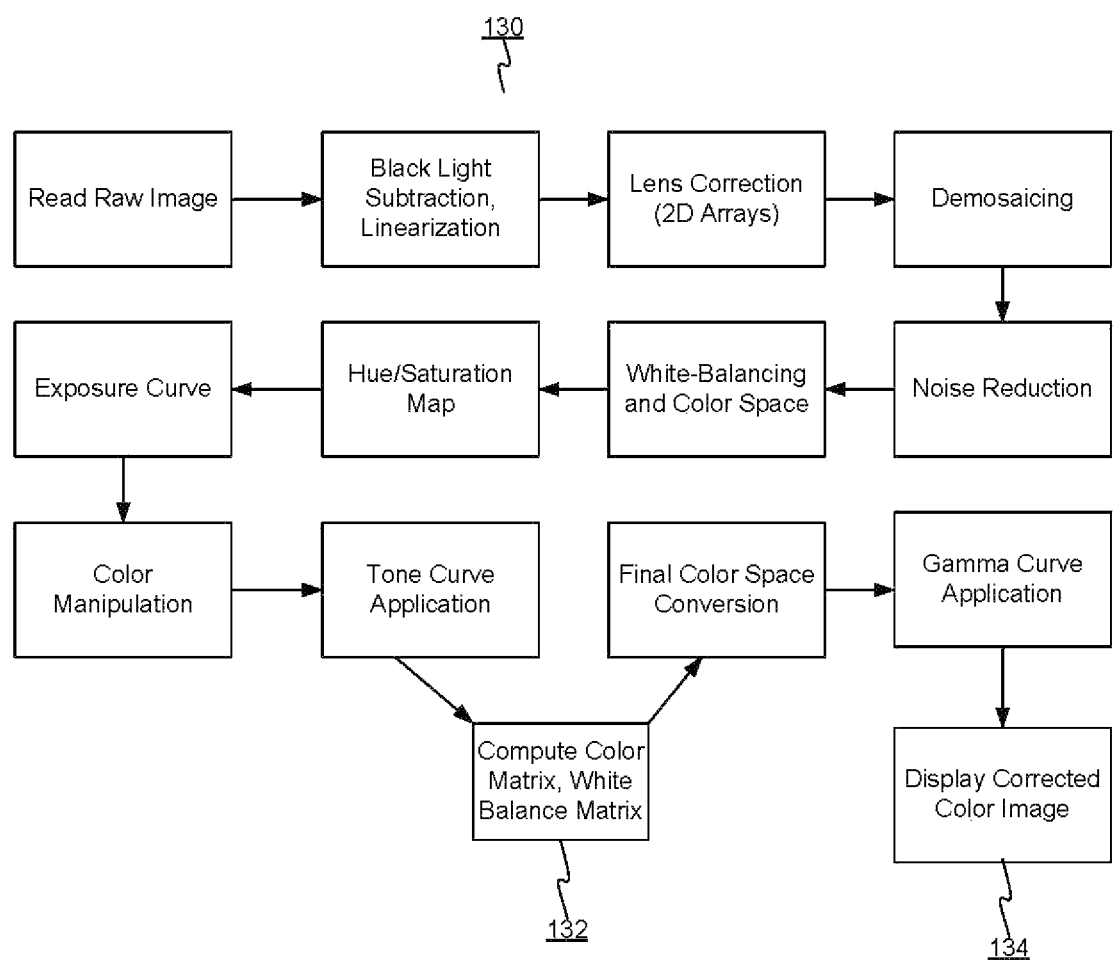
FIG. 5 shows an image signal processing (ISP) pipeline in accordance with one or more embodiments of the disclosure.

FIG. 5 shows an image signal processing (ISP) pipeline 130. The ISP pipeline 130 includes several known steps, for which description is outside of the scope of the present disclosure. Note that the white balancing of step 6 is performed by the camera before the image is outputted by the camera, whereas the color and white space conversion of step 11 is performed with color correction matrices and white balance matrices derived from embodiments described herein. At step 1 the raw image is read from the camera sensor. At step 2, blacklight is subtracted. At step 3, lens correction is performed (usually in-camera). Standard demosaicing is performed at step 4 (e.g., a Bayer filter or a Bayer modified for IR pixels), followed by white-balance and color correction at step 6. Hue and saturation may be adjusted at step 7. The exposure curve is adjusted at step 8, and color is manipulated at step 9. When the tone curve is applied at step 10, a color matrix and/or a white balance matrix may be computed at step 132 (see FIG. 6). At step 11, color space and white balance correction are performed with the color and white balance matrices from step 132. At step 12 a gamma curve adjustment is applied, and at step 134 the final image is displayed (or forwarded to an image processing algorithm such as a face recognition algorithm). Other than step 132, none of the steps are essential, and step 132 can be implemented either with an image outputted by the camera or it can be performed in-camera (as part of the camera's ISP pipeline) using the same techniques described herein. Further, one or more steps may be incorporated into a neural network which may receive one or more input parameters described in the present disclosure, such as raw image data and/or known values, such as the color space of objects permanent to the vehicle cabin. Further, said neural network ISP may further output higher level perception detections such as driver eye gaze, head pose, etc. in addition to or instead of a color and white balance corrected image. Alternativity such a neural network ISP may output a latent vector representation of the scene rather than a human readable image for purposes of input in other neural network input.

Figure 6:
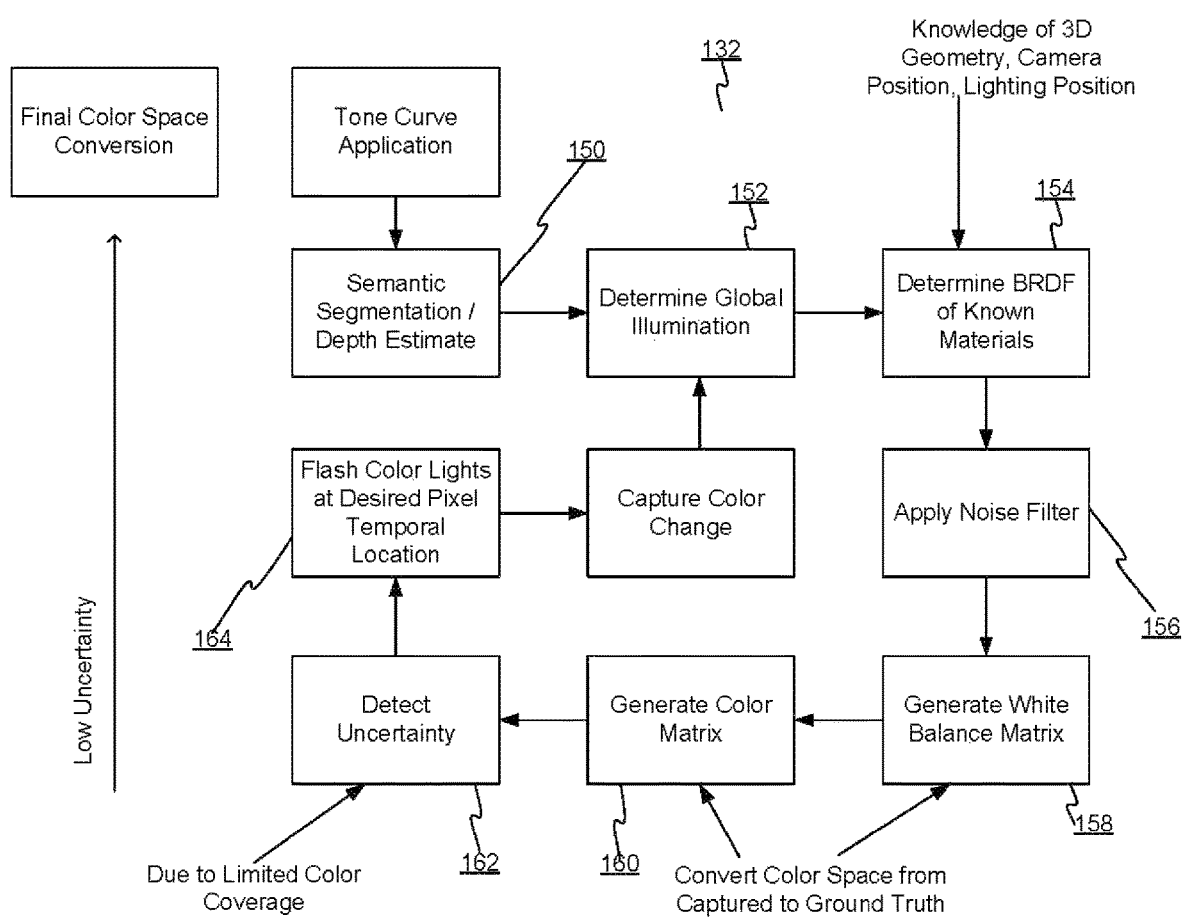
FIG. 6 shows details of a process for generating a color matrix and a white balance matrix in accordance with one or more embodiments of the disclosure.

FIG. 6 shows details of a process for generating a color matrix and a white balance matrix, and providing a color correction/augmentation/adjustment to the image data. As noted above, the process shown in FIG. 6 may begin with the tone curve application stage of the ISP pipeline as shown in FIG. 5. However, the process of FIG. 6 may be performed at other stages. At step 150 semantic segmentation and/or depth estimation is performed. This step may be performed by a properly trained convolutional neural network (CNN), for instance raw image(s) (e.g., with RGB data), depth estimate, semantic segmentation of known reflective pixels and unknown objects, known surface normal (of vehicle structure), known pixel reflectivity properties (such as color, BRDF, etc.), vehicle lighting power, color, and location may be incorporated as inputs into the model. The model may further be designed such that the color corrected image is an output. Alternatively, the output image may consist of a multi-spectral image. Further outputs of the model may be used in the training process to obtain the desired learning of the model such as outputting of the ambient light direction, ambient illumination color, illumination map, etc. Because the camera's location and orientation are known, it is possible to look within the image for known objects such as headrests, chrome bits, and so forth. Because their locations are known, they can be omitted as potentially being persons or other objects that may transit the cabin vehicle. They can also be isolated for color computation (use as de facto color charts).

At step 152, global illumination is computed using either a first principles approach or by treating chrome bits in the vehicle interior as light probes. Step 152 may be performed concurrent with step 150 or before step 150. Regarding the use of chrome (or reflective surfaces) as a light probe, a light probe can be used to get the characteristics of the lighting environment correct. In short, objects of known color in a cabin (de facto partial color calibration charts), reflected from a light probe, can be used to verify that the lighting environment is correct (or to correct it). The color of known objects may be limited but may sufficiently match a color chart, e.g., with white, gray, brownish, which may be sufficient for most cases. In other words, color space of the lighting environment can be obtained from specular reflection from a shiny object in the cabin. A light probe object may be reflective and of a known color (or colorless), and may have a combination of specular and diffuse reflectivity. If the camera has been characterized, and if objects in the scene have been characterized (e.g., seatbelts, headrests, reflective features of the probe parts), the image illumination of the scene, either abstractly or as seen for a 360-degree view, is possible to derive when the geometric solution of the dot product of "a" and "n" is solved in the equation discussed above.

At step 154, the BRDF of the known materials in the vehicle cabin is solved. This can be solved because the 3D geometry (camera position, position of permanent cabin objects) is known or may be estimated. Also, the lighting (sun) position can be inferred from vehicle orientation and sun orientation (which can be obtained from a lookup table based on date, time, and location). For example, solar position may be determined based on a day of the year and the time of day. Using knowledge of a vehicle's accelerometer data, the vehicle inclination/azimuth may be predicted relative to gravity. Based on the vehicle inclination/azimuth, a model (e.g., 3-D model) of a vehicle, the solar position, a solar irradiance (e.g., a Sky Radiance Model), a weather station modification, a 3-D city model, and/or a sun/sky color model, the lighting of the sun may be estimated relative to a vehicle's orientation at any date/time.

At step 156 a noise filter is applied to the image. At step 158, the white balance matrix is computed, and at step 160 the color correction matrix is computed. Steps 156 and 160 can be performed in either order. The steps are performed using the BRDF computed at step 154. At step 162, due to limited color space coverage (or color response functions) of the known materials in the vehicle cabin, uncertainty in the matrices is computed to decide if addition steps are necessary to improve the matrices. In terms of solving the matrices, a Random sample consensus (RANSAC) approach may be used. Some noise/sample points are generated. Noise can be estimated given the noise/sample points. If the level of uncertainty is above a threshold, then step 164 is performed; a variance of a cabin light can be measured (e.g., flashing the light, varying its intensity or color, etc.). At step 166 the color change is captured by the camera, and step 152 is revisited to further refine the matrices.

If, at step 162, the uncertainty of the matrices is low, then the color correction matrix and whit balance matrix are considered complete and are used for final correction and white balancing the image, and the final image is outputted for display and/or for processing by an application.

Figure 7:
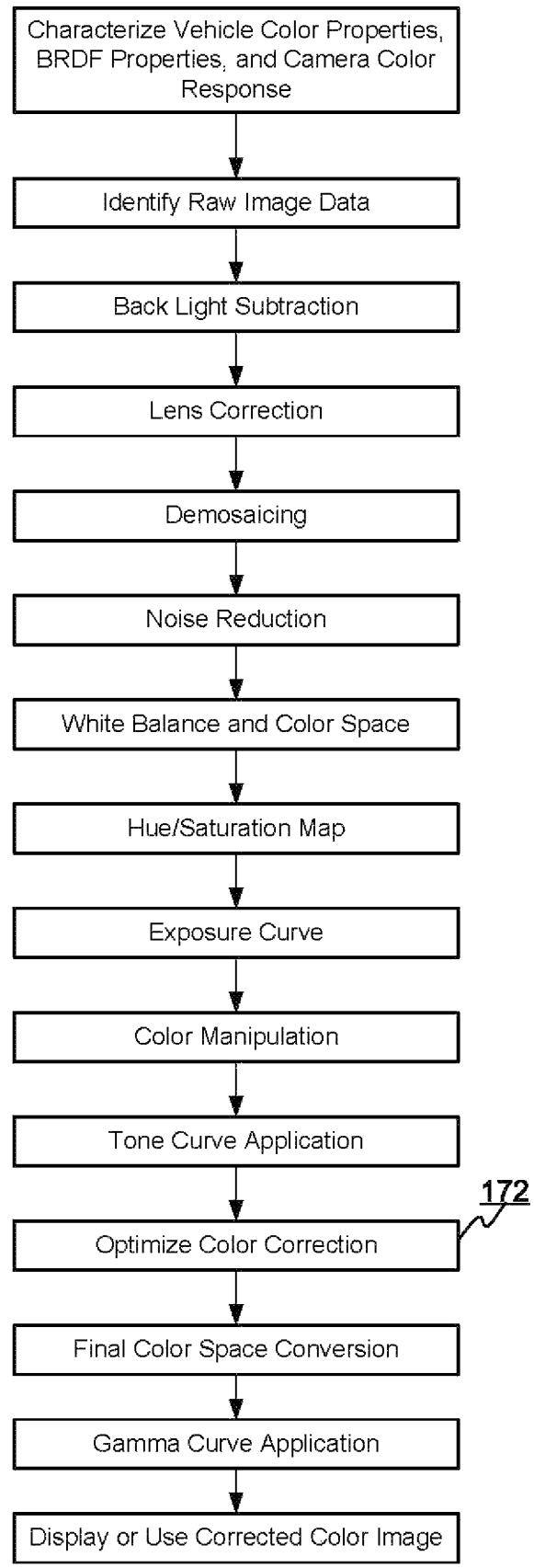
FIG. 7 shows a consolidation of the processes shown in FIGS. 5 and 6 in accordance with one or more embodiments of the disclosure.

FIG. 7 shows a consolidation 170 of the processes shown in FIGS. 5 and 6. In particular, step 172 represents the step when a device optimizes color correction using prior knowledge. The device may classify image pixels (e.g., using semantic segmentation via a neural network), may solve for global illumination, solve a BRDF function, and apply a noise filter. The device may compute white balance and color correction matrices to apply to known materials, resulting in a desired color space. The device may determine an uncertainty level for the data. For example, if the uncertainty level is high (e.g., exceeds a threshold), the device may flash/modulate interior lighting (e.g., lights inside of the vehicle cabin), resulting in a global illumination change or a shift in color of a single light indicator. The timing of the flash/modulation may be very short (e.g., not detectable by human eyes), and the resulting image may be used to augment the calculation of the lighting.

Figure 8:
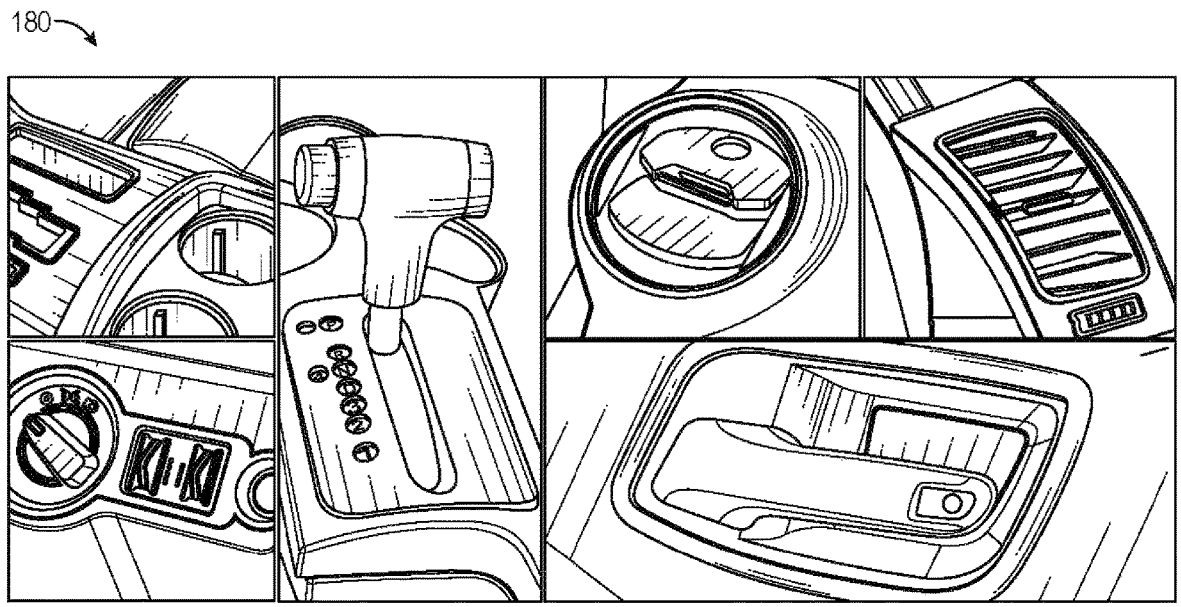
FIG. 8 shows examples of reflective cabin surfaces in accordance with one or more embodiments of the disclosure.

FIG. 8 shows examples of reflective cabin surfaces 180.

FIG. 9 shows details of a vehicle 398 equipped with a computing device 400 and camera 102. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 400 to implement any of the features or embodiments described herein.

The computing device 400 may have one or more displays 402, a network interface 404 (or several), as well as storage hardware 406 and processing hardware 408, which may be a combination of any one or more: central processing units, graphics processing units, analog-to-digital converters, bus chips, FPGAs, ASICs, Application-specific Standard Products (ASSPs), Complex Programmable Logic Devices (CPLDs), image processors, etc. The storage hardware 406 may be any combination of magnetic storage, static memory, volatile memory, non-volatile memory, optically or magnetically readable matter, etc. The meaning of the term "computer-readable storage", as used herein does not refer to signals or energy per se, but rather refers to physical apparatuses and states of matter. The hardware elements of the computing device 400 may cooperate in ways well understood in the art of machine computing. In addition, input devices may be integrated with or in communication with the computing device 400. The computing device 400 may have any form-factor or may be used in any type of encompassing device.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such labels or phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A method performed by one or more computing devices comprising processing hardware and storage hardware, the method performed by the processing hardware executing instructions from the storage hardware, the method comprising:

receiving an image captured by a camera, the image comprising a representation of a cabin area of a vehicle;

demosaicing the image; and optimizing white balancing of the image based on previously determined data associated with the cabin area of the vehicle, the previously determined data comprising color information for a material of the cabin area of the vehicle, the optimizing comprising:

classifying pixels in the image;
solving global illumination for the image;
based on the classification of the pixels and the global illumination, solving a bidirectional reflectance distribution function (BRDF) for the color information about the material in the cabin area of the vehicle; and
based on the BRDF, generating a white balance matrix for the image;
applying the white balance matrix to the image; and
outputting the white-balanced image.

2. The method according to claim 1, further comprising:
based on the BRDF, generating a color correction matrix for the image; and
applying the color correction matrix to the image.

3. The method according to claim 1, further comprising applying a noise reduction filter to the image prior to generating the white balance matrix.

4. The method according to claim 1, further comprising:
determining that an uncertainty level of the white balance matrix exceeds a threshold;
based on the determining that the uncertainty level exceeds the threshold, activating lighting of a light in the cabin area of the vehicle;
capturing a second image from the camera during the activated lighting of the light; and
based on the second image, solving a second BRDF for the color information about the material in the cabin area of the vehicle.

5. The method according to claim 4, further comprising recomputing the white balance matrix based on the second BRDF.

6. The method according to claim 1, wherein the previously determined data further comprise information about a chrome material in the cabin area.

7. The method according to claim 6, wherein pixels in the image that correspond to the chrome material are used as color space information for solving the BRDF.

8. The method according to claim 1, wherein the material comprises a seat, a headrest, a seatbelt, or a material covering a structural element of the cabin area.

9. Computer-readable storage hardware storing information configured to, when executed by a computing device, cause the computing device to perform a process, the process comprising:
receiving an image from a camera incorporated in a cabin of a vehicle; and
optimizing color correction and white balancing of the image via prior knowledge of the cabin of the vehicle, the prior knowledge comprising color information, the color information comprising information about color and/or reflectivity of one or more surfaces of the cabin area, the optimizing comprising:
applying a segmentation algorithm to the image to either classify pixels in the image or to compute depths of pixels in the image;
based on the classification or depth of the pixels, solving a bidirectional reflectance distribution function (BRDF) for the color information; and
based on the BRDF, computing a white balance matrix and a color correction matrix for the image;
applying the white balance matrix and the color correction matrix to the image; and
after the step of applying the white balance matrix and the color correction matrix to the image, storing or displaying the image.

10. The computer-readable storage hardware according to claim 9, wherein the optimizing further comprises solving global illumination for the image, and wherein the solving the BRDF is further based on the global illumination.

11. The computer-readable storage hardware according to claim 10, wherein the solving the BRDF is further based on information about position of the camera and position of the sun relative to the camera.

12. The computer-readable storage hardware according to claim 9, wherein the white balance matrix and the color correction matrix are further based on pixels in the image determined to correspond to a reflective element of the cabin.

13. The computer-readable storage hardware according to claim 9, wherein the image is captured by the camera while controlling lighting of a cabin light in the cabin, and wherein the white balance matrix and the color correction matrix are further based on the lighting of the cabin light.

14. The computer-readable storage hardware according to claim 13, wherein the lighting is controlled responsive to a determination about noise corresponding to the white balance matrix or the color correction matrix.

15. A method performed by a computing device, the method comprising:
receiving an image from a camera built into a cabin of a vehicle;
demosaicing the image and applying a noise reduction step to the image;
applying a segmentation algorithm to the image;
solving global illumination for the image;
based on the segmentation of the image and the global illumination, solving a bidirectional reflectance distribution function (BRDF) for at least one of color or reflectance information of material in the cabin of the vehicle;
based on the BRDF, computing a white balance matrix and a color correction matrix for the image;
applying the white balance matrix and the color correction matrix to the image; and
storing or displaying the white-balanced and color-corrected image.

16. The method according to claim 15, wherein the segmentation algorithm comprises a convolutional neural network.

17. The method according to claim 15, wherein the color correction matrix and the white balance matrix are computed based on information about lighting external to the cabin.

18. The method according to claim 15, further comprising determining a noise level according to the white balance matrix or the color correction matrix.

19. The method according to claim 18, further comprising activating a cabin light of the cabin based on determining the noise level.

20. The method according to claim 15, wherein the white balance matrix and color correction matrix are computed from the image by first applying a noise filter to the image.

* * * * *